United States Patent [19]

Bretschneider et al.

[11] 4,071,716
[45] Jan. 31, 1978

[54] DICTATION SYSTEM

[75] Inventors: Hermann Bretschneider, Vienna, Austria; Herman Pieter Hueber, Eindhoven, Netherlands; Friedrich Louzil, Vienna, Austria

[73] Assignee: U.S. Philips Corporation, New York, N.Y.

[21] Appl. No.: 623,619

[22] Filed: Oct. 20, 1975

[30] Foreign Application Priority Data

Oct. 22, 1974 Austria .................................. 8492/74

[51] Int. Cl.² ...................... H04M 11/10; G11B 5/86
[52] U.S. Cl. .............................. 179/100.1 DR; 360/8; 179/6 E
[58] Field of Search ............. 179/100.1 DR, 6 R, 6 E, 179/100.1 R, 100.1 S; 360/8, 137

[56] References Cited

U.S. PATENT DOCUMENTS

| 2,281,405 | 4/1942 | Barrish | 360/8 |
|---|---|---|---|
| 3,467,781 | 9/1969 | Feat | 179/6 E |
| 3,499,116 | 3/1970 | Jeske | 179/100.1 DR |
| 3,511,935 | 5/1970 | Mizuno | 179/6 E |
| 3,671,680 | 6/1972 | Nye | 179/100.1 DR |
| 3,678,484 | 7/1972 | Maxwell | 360/8 |
| 3,718,906 | 2/1973 | Lightner | 360/15 |
| 3,953,680 | 4/1976 | Zimmermann | 179/6 E |

Primary Examiner—Bernard Konick
Assistant Examiner—Alan Faber
Attorney, Agent, or Firm—Frank R. Trifari; David R. Treacy

[57] ABSTRACT

A dictation system with several remote stations and at least one central station. Each remote station includes a recording and playback machine for recording dictation at normal record carrier transport speed, and upon completion of the dictation said dictation can be transmitted to and recorded on the machine of the central station in continuous form at a higher speed of transport, actuation of the switching means for transmission being cancelled by changing the record carrier in the remote station machine.

4 Claims, 3 Drawing Figures

DICTATION SYSTEM

BACKGROUND OF THE INVENTION

The invention relates to a dictation system with a multiplicity of remote stations and with one central station which can be selected by said remote stations and which comprises at least one recording and playback machine, which remote stations can optionally be connected to the central station when said station is free for the transmission of dictations.

Such a dictation system is for example known from DT-AS 1,151,287. In such dictation systems a connection is established and maintained between a remote station and a recording and, as the case may be, playback machine of the central station for the duration of a dictation, so that said machine of the central station as well as the connection means to said machine of the central station are engaged during said time interval and are consequently not accessable to other users. However, experience has taught that the dictation time owing to dictation pauses, error corrections and similar time-consuming operations, is a multiple of the actual length of a complete continuous dictation, so that consequently said busy periods are also substantial. However, for an effective use of such a dictation system these busy periods must be minimized.

SUMMARY OF THE INVENTION

It is an object of the invention to provide a solution to said problem associated with a dictation system of the type mentioned in the preamble. For this, the invention is characterized in that each remote station comprises a recording and playback machine by means of which a dictation can be recorded at the normal speed of transport of the record carrier, and that said machine includes a switching means by whose actuation, which is effected upon completion of a recording procedure, when the central station is not busy, a signal path connection can be established between the machine of the remote station and the machine of the central station for the transmission of the dictation, and in the machine of the remote station a "playback transmission" mode can be switched on for playing back the recorded dictation at a predetermined speed of transport of the record carrier, the quotient of said predetermined speed and the normal speed being at least one and preferably of the order of magnitude of ten, and in the machine of the central station "recording transmission" mode can be switched on for recording the dictation to be transmitted at a further predetermined speed of transport of the record carrier, a transmitted dictation which has been recorded on the machine of the central station being played back at a speed which is substantially smaller, by said quotient, than the further predetermined speed of the record carrier in the machine of the central station in the "recording transmission" mode.

A dictation system according to the invention has the advantage that is enables any user at a remote station to complete a dictation entirely, without any other part of the dictation system being occupied. As soon as the completed dictation is available at the remote station, said dictation is transmitted to a machine of the central station is continuous form, so that said machine of the central station and also the connection means with the machine of the central station are only engaged for the duration of the transmission of the dictation in continuous form. This advantage becomes particularly apparent when a dictation which has been recorded on a machine of a remote station is transmitted at a higher speed of transport of the record carrier in said machine than during recording of said dictation. Furthermore, owing to the steps according to the invention, each user can utilize the facilities and advantages of a separate machine, such as for example direct visual checking of the modes of operation and the functional condition of the machine, and each user has a separate record carrier, which is preferably accommodated in a cassette, at his disposal, for example for storage and checking purposes.

An advantageous embodiment of a dictation system according to the invention is characterized in that the predetermined speed of the record carrier in the machine of a remote station in the "playback-transmission" mode and the further predetermined speed of the record carrier in the machine of the central station in the "recording-transmission" mode are substantially equal. This step ensures that both the machines of the remote stations and the machines of the central station can have a similar construction of the drive system, which is advantageous in view of a uniform and rational design of the dictation system and the compatibility of the machines of the remote stations and the central station.

In a particularly advantageous embodiment of a dictation system according to the invention, which affords great ease of operation, the central station comprises a selection means, which can be selected by the actuation of the switching means of the machine of a remote station, the remote station thus calling the central station. When the remote station has priority over the switching means of the machine of all other calling remote stations, the selection means when the central station is engaged blocks the switching means of the machines of all other calling remote stations from switching on the playback transmission mode and when the central station is free establishes a connection with a machine of a calling remote station and unblocks the switching means of the machine of said selected remote station, the selected modes of operation of the selected remote station being cancelled and the central station being cleared by an end stop means upon completion of the transmission of a dictation to be recorded on the machine of the central station. In this respect it is advantageous to design the system so that each remote station can call the central station also when the central station is busy, without waiting for the central station to be cleared, while after clearance of the central station the calling remote stations are automatically and consecutively connected to the central station by the selection means for the transmission of dictations. Consequently, the user of a remote station need not wait for the instant that the central station is cleared to transmit a dictation to said central station, which saves time for the user.

Furthermore, it has been found to be particularly advantageous if the actuation of a switching means of the machine of a remote station, when said switching means is blocked by the selection means of the central station if this is engaged, can be cancelled by changing the record carrier in the machine of said remote station. This ensures that in a machine of a remote station which has called the central station, the switching means of the machine of said remote station is reset to its rest position by changing the record carrier, before the dictation recorded on said record carrier is transmitted to the central station, and that thus the selection of the central station by said remote station is automatically cancelled, for example in order to record a further dictation on a different record carrier as long as the central station is still engaged.

In a further advantageous embodiment of a dictation system according to the invention provision has been made that upon actuation of the switching means of the machine of a remote station before the "playback transmission" mode is switched on the record carrier is first rewound to the beginning of the dictation in the "rewind" mode. This ensures that in the machine of each remote station both when a dictation is recorded and when said dictation is played back in the "playback transmission" mode the direction of movement of the record carrier is the same, so that in particular machines of the remote stations a simple construction of the drive mechanism for the record carrier is possible.

When a slightly more intricate construction of the drive mechanism is accepted, a further saving of time can be achieved according to the invention in that after final completion of a recording operation in the machine of a remote station in the "playback transmission" mode the direction of transport of the record carrier is opposed to that during recording of a dictation and that in the machine of the central station after a transmitted dictation has been recorded the direction of transport of the record carrier is also opposed to that in the "recording transmission" mode during playback of the dictation. Thus, in this dictation system a dictation is transmitted from a remote station to the central station directly after said dictation has been recorded, so that it is not necessary to rewind the record carrier, thus yielding a further saving in time.

The invention will be described in more detail with reference to some embodiments shown in the drawing, although it is not limited thereto.

Figure 1:
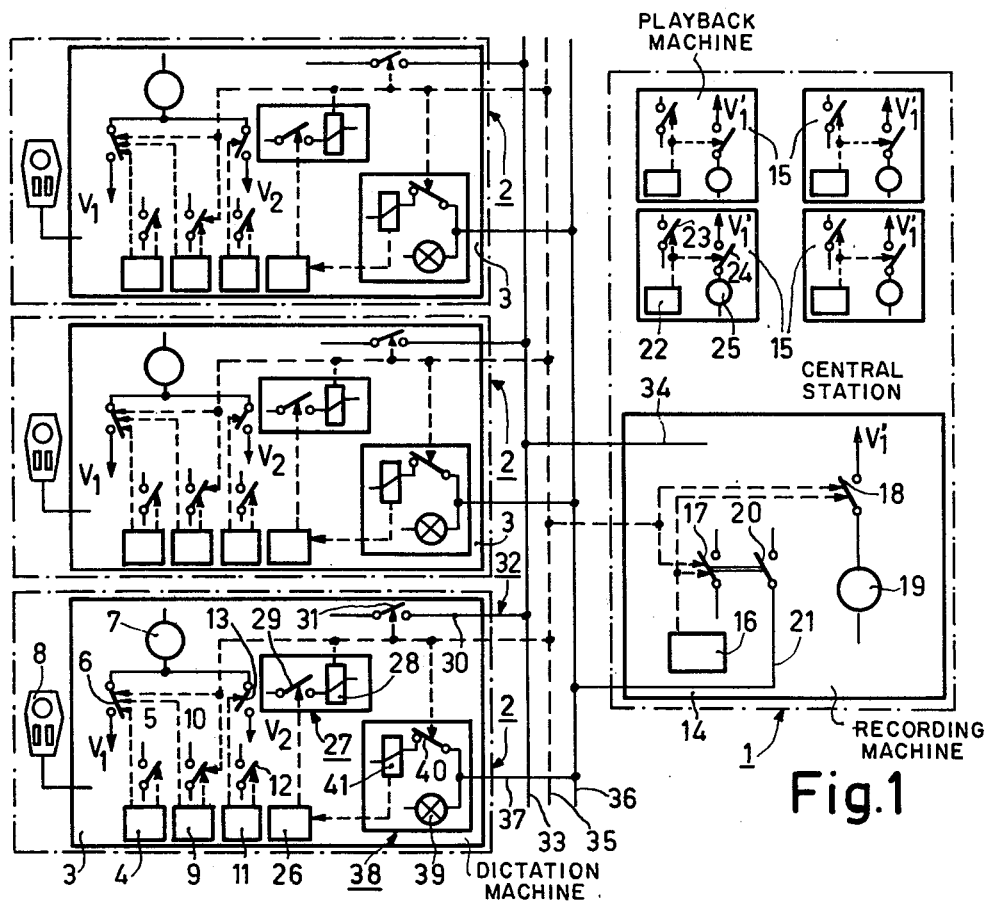
FIG. 1 is a schematic block diagram of a dictation system in which the record carrier in the machine of each remote station has the same speed and the same direction of movement both during recording of a dictation and during transmission of said dictation from a remote station to the central station.

When in an example several identical machines occur, only one of said machines in the Figures is provided with all the reference marks for the sake of simplicity. Furthermore, it is to be noted that in the drawings signal connections are represented by uninterrupted lines and control connections by dashed lines.

DESCRIPTION OF THE PREFERRED EMBODIMENTS

In FIG. 1 a central station of the dictation system, which is symbolically surrounded by dash-dot lines, bears the reference numeral 1. The central station 1 can be selected from several mutually identical remote stations 2, which are also surrounded by dash-dot lines, whilst optionally one of the remote stations 2 can be connected to the central station 1 if said station is free, which will be explained hereinafter.

Each remote station 2 comprises a recording and playback machine 3, hereinafter referred to as dictation machine 3 for the sake of simplicity, of which only those components which are essential in this context are represented schematically, and by means of which dictation machine 3 a dictation can be recorded when the record carrier is advanced with normal speed. For this purpose each dictation machine 3 comprises a recording button 4 for switching on the "recording" mode, by whose actuation a switch 5 for switching on the recording functions and a switch 6 for connecting a motor 7 to a voltage source V1, for a record carrier transport at normal speed, can be actuated. A dictation is then spoken into a microphone 8 which is connected to the dictation machine 3, on which microphone an actuating element which is equivalent to the recording button 4 may be provided, so that said functions can also be switched on from the microphone. In order to enable a recorded dictation to be played back, each dictation machine 3 comprises a playback button 9 for selection of the "playback" mode, by means of which via a switch 10 the playback functions can be switched on, the switch 6 then again being actuated for connecting the motor 7 to the voltage source V1 for record carrier transport at normal speed. For playing back a recorded dictation or a part thereof, the record carrier must be rewound accordingly, as is normally the case. For this purpose each dictation machine 3 comprises a button 11 for selection of the "fast rewind" mode, by mans of which a switch 12, for switching on the fast-rewind functions in the dictation machine 3, and a switch 13 can be actuated, which switch 13 connects the motor 7 to a voltage source V2 for record-carrier transport at increased speed in a direction opposite to the direction in the "recording" or "playback" modes. Rewinding of the record carrier and subsequent playback of a dictation or a part thereof is important, particularly in view of repetitions, corrections etc.

In this way a dictation may be completed entirely on a dictation machine 3 of a remote station, without the need for a connection to the central station 1. For the transmission of such a completed dictation each remote station 2 can optionally be connected to the central station 1 when said station is free. The central station 1 includes a recording machine 14, hereinafter referred to as central machine for the sake of simplicity, and several separate playback machines 15, only those components of both the central machine 14 and the playback machines 15 which are essential in this context being shown schematically.

For selecting the "recording" mode the central machine 14 comprises a recording button 16, by means of which a switch 17 for switching on the recording functions in the central machine 14 and a switch 18 for connecting a motor 19 to a voltage source V1 can be actuated. By connecting the motor 19 to the voltage source V1' the record carrier in the central machine 14 can be driven at a predetermined transport speed, which in the present instance differs from the normal transport speed of the record carriers in the dictation machines 3. The predetermined transport speed of the record carrier in the central machine 14 has been chosen to be lower than the normal transport speed of the record carriers in the dictation machines 3, so that a higher storage capacity is obtained in the central machine 14 compared with the dictation machines 3. For selection of the recording functions a further switch 20 is coupled to the switch 17 to which a line 21 is connected and which serves for detecting whether in the central machine 14 the recording functions are switched on.

For switching on the "playback" mode each of the playback machines 15 in the central station 1 comprises a playback button 22 by means of which in each of the playback machines 15 a switch 23 for switching on the playback functions and a switch 24 for connecting a motor 25 to a voltage source V1' can be actuated. When a motor 25 is connected to the voltage source V1' the record carrier in the relevant playback machine 15 is driven with the same transport speed as the record carrier in the central machine 14.

In order to transmit a finished dictation, which is available in continuous form, to the central station 1 after recording of a dictation on a dictation machine 3 has been completed, starting from its beginning which is reached after rewinding, each dictation machine 3 is equipped with a switching means 27 which can be switched on by means of a transmission button 26. As will be explained hereinafter, the transmission button 26 can be actuated in only one of the dictation machine 3 at a time, so that simultaneous transmission of two dictations is not possible. The switching means 27 includes a transmission relay 28, which can be energized by the closure of a switch 29 which can be actuated by the transmission button 26. By the energization of the transmission relay 28 when the central station 1 is free a switch 31, which is included in an output signal line 30 of each dictation machine 3, can be closed, so that a signal path 32, which is constituted by said output signal line 30, a common connection line 33 to which all output signal lines 30 are connected, and an input signal line 34 of the central machine 14, can be established between each dictation machine 3 and the central machine 14 for the transmission of the dictation. Furthermore, by the energization of the transmission relay 28 in each dictation machine 3 it is possible to switch on a "recording transmission" mode, in which the switch 10 for switching on the playback functions in the dictation machine 3 and the switch 6 for connecting the motor 7 to the voltage source V1 for a record carrier transport with the normal speed in the dictation machine 3, are closed, and a "recording transmission" mode can be switched on in the central machine 14 via a control connection 35 which is common for all dictation machines 3, in which mode the switch 17 for switching on the recording functions in the central machine 14 and the switch 18 for connection of the motor 19 to the voltage source V1, for driving the record carrier in the central machine 14 as previously stated, are closed. Thus, the "recording" mode of the central machine 14 can be switched on from each remote station 2. It is not necessary per se to provide a separate recording button 16 on the central machine 14, but this has been found to be effective, for example in order to enable the functional condition of the central machine to be checked.

By the actuation of the transmission button 26 of a dictation machine 3 the recorded dictation is played back on this dictation machine at the predetermined normal transport speed of the record carrier in the "playback transmission" mode, the played-back dictation being transmitted to the central machine 14 via the signal path 32 which is closed by the switch 31 in the output signal line 30, and is recorded on said central machine in the "recording transmission" mode with a further predetermined transport speed of the record carrier, which in the present instance is lower than the normal transport speed of the record carrier in the dictation machine 3. As in the "recording" and "playback transmission" modes of the dictation machines 3 the same transport speed is selected for the record carrier, and the transport speed of the record carrier in the central machine 14 in the "recording transmission" mode and the transport speed of the record carrier in the playback machines 15 of the central station 1 during playback of the transmitted dictations are also the same, so that the frequency spectrum of the transmitted dictations is not substantially disturbed.

As previously stated, the switch 20, which is coupled to the switch 17, is closed when in the central machine 14 the recording functions are switched on. The line 21, which is connected to the switch 20, is connected to a further common connection line 36, to which connection lines 37 of indication means 38 provided in each dictation machine are connected. Each indication means 38 comprises a pilot lamp 39 which is connected to the connection line 37 and a locking relay 41 which is also connected to the connection line 37 via a normally-closed switch 40, which relay serves to prevent the actuation of the transmission button 26 when the central station 1 is engaged.

When in the central machine 14 the recording functions are switched on, the switch 20 is closed, As a result the pilot lamps 39 of all the dictation machines 3 are switched on, so that the user of the dictation machine 3 which is connected to the central machine 14 has a visual check that the machine is connected to the central machine 14, and in all further dictation machines 3 an indication is given of the engaged condition of the central machine 14. In the dictation machine 3 which is connected to the central machine 14 the switching means 27, which is switched on by the actuation of the transmission button 26, opens the switch 40 of the indication means 38, so that owing to the closure of the switch 20 in the central machine 14 the locking relay 41, which is connected in series therewith, is not energized. Locking relays 41 of all the other indication means 38, however, are energized via the closed switches 40 and in conventional manner, for example electromagnetically, prevent the transmission button 26 in these dictation machines 3 from being actuated, so that double engagement of the central machine 14 or a simultaneous transmission from two dictation machines 3 is not possible.

In the previously described embodiment the central station comprises only one central machine for recording transmitted dictations. It is obvious that if desired, the central station may also comprise more such central machines, while in known manner a device ensures that each time a free central machine is connected to a dictation machine of a remote station which calls the central station. The central machine may also take the form of a changer for record carriers accommodated in cassettes.

The transcription of dictation which have been transmitted to the central station is effected at the playback machines at said station, which machine may for example be accommodated in a writing desk. Several or only one dictation may then be stored on a record carrier which is preferably accommodated in a cassette, which record carrier is transferred from a central machine to a playback machine.

By means of such a dictation system it is readily possible to separately record a dictation at every remote station, without occupying the central station and the connection means to said station. Thus, it is not necessary for example to limit the maximum permissible dictation length for the users of the remote stations, which is generally done so as to avoid the central station from being occupied too long by one of the remote stations. As soon as a dictation is completed at a remote station, said dictation is transmitted to the central station in continuous form, which has the further advantage that shorter occupation times of the central station are obtained, while transmission of the dictation in continuous form demands considerably less time than recording the complete dictation. In such a dictation system the record carriers used in a remote station always remain there, so that the user of such a remote station moreover has the advantage that a subsequent check of the dictation which has been transmitted to the central station is possible.

Figure 2:
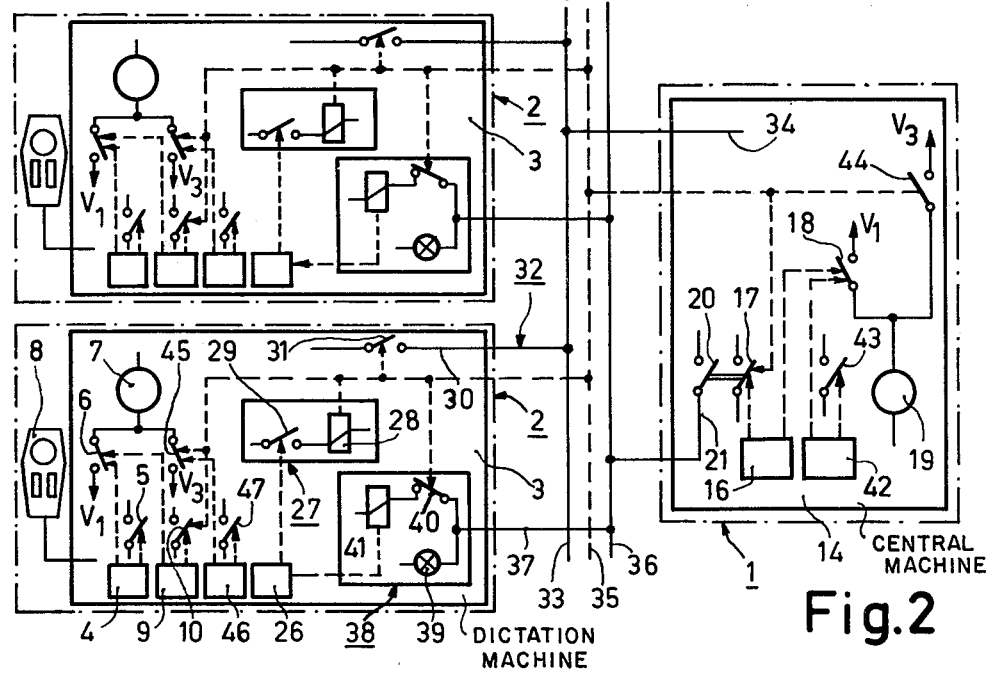
FIG. 2 is a schematic block diagram of a dictation system in which during transmission of a dictation the record carrier in the machine of each remote station has a direction of movement opposite to that during recording of said dictation.

The dictation system of FIG. 2 is of a design similar to that of FIG. 1, while in this case the record carrier in the central machine 14 can be driven with the same normal transport speed as the record carrier in the dictation machine 3. The central machine 14 of the central station 1 also takes the form of a playback machine, for which purpose it comprises a playback button 42 for switching on the "playback" mode, which button can actuate a switch 43 for switching on the playback functions and the switch 18 for connecting the motor 19 to the voltage source V1, for record carrier transport at normal speed. Furthermore, the motor 19 may be connected to a voltage source V3 via a further switch 44, so that the record carrier in the central machine 14 can be driven with the same transport speed but in a direction of transport opposed to that in the "recording" or "playback" mode. In a similar way the motor 7 in each dictation machine 3 can be connected to a voltage source V3 via a switch 45, as a result of which the record carrier can be driven with normal speed but in a direction opposite to that in the "recording" or "playback" mode. The switch 4 can then be actuated by a button 46 which is provided for switching on the "rewind" mode, which button can close a switch 47 for switching on the rewind functions.

For the transmission of a completed dictation. which has been recorded on a dictation machine 3 of a remote station, the transmission button 26 must be actuated again, so that the signal path 32 from said dictation machine 3 to the central machine 14 is closed by the switching means 27. Furthermore, the "recording transmission" mode is then switched on in the dictation machine 3, while in the dictation machine 3 the switch 10 for switching on the playback functions and the switch 45 for switching on the rewind functions and in the central machine 14 the switch 17 for switching on the recording functions and the previously mentioned switch 44 are closed. Thus, in the "playback transmission" mode the record carrier in the dictation machine 3 is driven in a direction of transport which is opposite to that in the "recording" mode, while in the central machine 14 during subsequent playback of the transmitted dictation the record carrier is also driven in a direction opposite to that in the "recording transmission" mode.

In the present dictation system a dictation which has been completed at a remote station can be transmitted directly from said remote station to the central station after completion of the dictation, without the necessity of previously rewinding the record carrier in the dictation machine of a remote station to the beginning of a dictation to be transmitted. By means of this step a further advantageous saving of time can be achieved.

In the dictation system of FIG. 2, as previously stated, the speeds of transport of the record carriers in the dictation machines of the remote stations in the "recording" mode and in the central machine in the "recording" mode and the speeds of transport of the record carriers in the dictation machines of the remote stations in the "playback transmission" mode and in the central machine in the "recording transmission" mode are equal, so that all machines of the dictation system have the same construction as regards the drive means.

Figure 3:
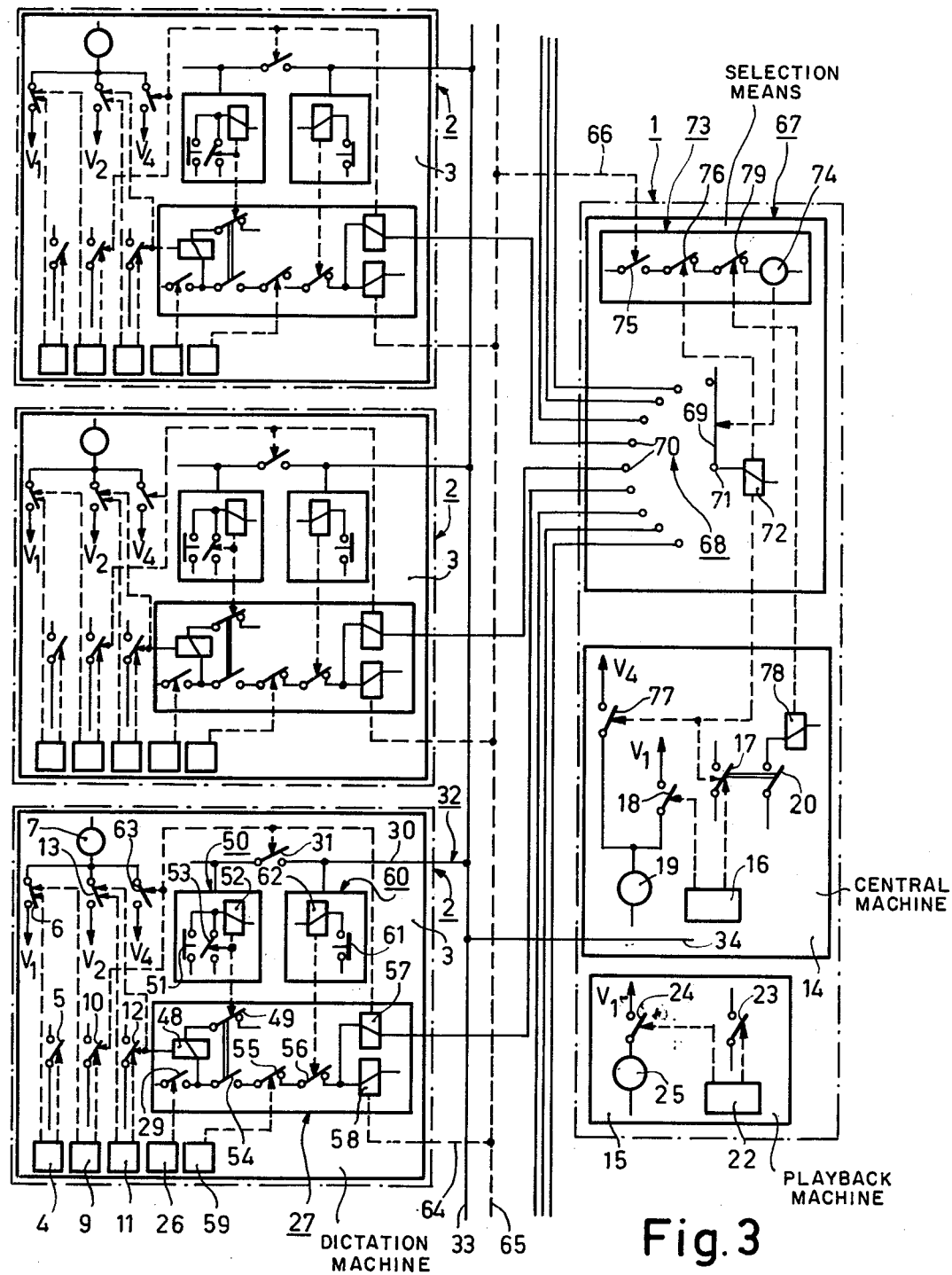
FIG. 3 is a similar diagram of a dictation system in which the record carrier in the machine of each remote station is rewound to the beginning of the dictation before transmission of said dictation and during transmission of the dictation is driven with a higher transport speed than during the recording of this dictation and in which the central station is provided with a selection means for establishing a connection between the central station and one of the remote stations.

In the dictation system of FIG. 3 a sequence of functions is employed in which after recording of a dictation on a dictation machine 3 of a remote station 2 has been completed the record carrier is first automatically rewound to the beginning of the dictation in the "fast rewind" mode by the actuation of the switching means 27 of said machine, and subsequently, in the "playback transmission" mode for transmission of the dictation to the central machine 14, is driven in the same direction of transport as in the "recording" mode but, with a higher transport speed than in the "recording" mode.

To implement said sequence of functions, each switching means 27 of the dictation machines 3 is constructed as follows. The switching means 27 again comprises a switch 29 which can be closed by the transmission button 26, by whose actuation a rewind relay 48 can be energized with which the "fast rewind" mode can be switched on. The rewind relay 48 is included after a normally closed switch 49, which can be controlled by a detection means 50 which serves for detecting the beginning of a dictation. The detection means 50 is connected to the output signal line 30 at the side of the switch 31 which is remote from the common connection line 33, which switch 31 serves for closing the signal path 32 from the dictation machine 3 to the central machine 14, and said detection means 50 comprises a control switch 51, which can for example be closed in known manner by a magnetic marking on the record carrier at the beginning of a dictation or by the absence of speech signals, i.e. in a voice-controlled manner. By the closure of the control switch 51 a detection relay 52 can be energized, which has a self-holding contact 53 and which causes the switch 49 of the switching means 27 to open, so that after the beginning of a dictation is reached the rewind relay 48, which was energized by the actuation of the transmission button 26, is de-energized, and thus the "fast rewind" mode is switched off.

To the switch 49, which can be controlled by the detection means 50, a further switch 54 is coupled which is connected in series with the switch 29, which switch 54 is closed upon rewinding, so that the switching command which is given by the transmission button 26 to the switch 29 is transferred to a first transmission relay 57 and a selection relay 58 via said switch 54, a further normally closed switch 55 and still another normally-closed switch 56.

The switch 55 can be actuated by a button 59, upon whose actuation, in a manner not shown, a record carrier located in the dictation machine 3 and is preferably accommodated in a cassette, can be changed, for example for recording another dictation. The switch 55 is then opened by such a change of a record carrier, so that a switched-on switching means 27 is then switched off again.

The switch 56 serves for switching off the switching means 27 after transmission of a dictation from the dictation machine 3 to the central machine 14 and can be controlled by an end-stop means 60, which is connected to the output signal line 30 of the dictation machine 3 at the side of the switch 31 which faces the common connection line 33, which switch 31 is included in the signal path 32 between the dictation machine 3 and the central machine 14. In a similar way as the detection means 50 the end stop means 60 comprises a control switch 61, which can also be voice-controlled or controlled by a magnetic marking which identifies the end of a dictation. It is obvious that, if desired, also other control methods may be considered, such as control depending on record-carrier stoppage or on the position of a counter. Via the control switch 61 an end-stop relay 62 can be energized, by means of which the switch 56 can be actuated, thus ensuring that at the end of the transmission of a dictation the switching means 27 is automatically switched off.

The first transmission relay 57 of the switching means 27 serves for actuating the switch 31 in order to close the signal path 32 between the dictation machine 3 and the central machine 14, and for switching on the "playback transmission" mode in the dictation machine 3. The first transmission relay 57 can be energized only when a connection is established between the dictation machine 3 and the central machine 14, a second transmission relay in the central machine 14 then being energized, as is to be explained hereinafter. In the "playback transmission" mode of a dictation machine 3 the switch 10, for switching on the playback functions, and a further switch 63 are closed, which switch 63 connects the motor 7 of the dictation machine 3 to a voltage source V4, so that the record carrier in the dictation machine can be driven in the same direction of transport as in the "recording" or "playback" mode, but with a higher, for example ten times higher, speed of transport than in these two modes of operation.

The selection relay 58 of the switching means 27 of the dictation machine 3 serve to establish a connection between this dictation machine and the central machine 14. For this purpose the selection relay 58 is connected to an input control connection 66 which leads to the central station via an output control connection 64 of the switching means 27 and a control connection 65 which is common for all output control connections. The input control connection 66 then leads to a selection means 67 which is incorporated in the central station 1, which means as previously stated, can be selected by the switching means 27 of the dictation machines 3 and has priority over these switching means.

The selection means 67 comprises a selector 68 which includes a rotary switching arm 69, which can be driven in a manner explained hereinafter, which connects one of the inputs 70 to one of the first transmission relays 57 of the switching means 27 of the dictation machines 3, and to whose output 71 a second transmission relay 72 is connected. The switching arm 69 of the selector 68 can be driven by a drive means 73, which comprises a motor 74 for driving the switching arm 69. The motor 74 can be switched on by a switch 75 which can be closed by the selection relay 58 of the switching means 27 of a dictation machine via the control connections 64, 65 and 66. Thus, when the switching means 27 of a dictation machine 3 is actuated, the motor 74 is started at the switching arm 69 is set into motion. Thus, when the switching arm 69 has reached that input 70 of the selector 68 to which the first transmission relay 57 of the actuated switching means 27 is connected, a connection is established between the switching meamns 27 of the calling dictation machine 3 and the second transmission relay 72 at output 71 of the selector 68, so that the two transmission relays 57 and 72 are energized.

On the one hand, the second transmission relay 72 serves for stopping the motor 74 of the drive means 73 for the switching arm 69 of the selector 68, for which purpose the second transmission relay is operatively connected to a normally closed switch 76 in the drive means 73, which switch 76 is connected in series with the switch 75. As soon as the selector 68 has established a connection with one of the dictation machines 3, so that a dictation can be transmitted, its drive is automatically stopped. On the other hand, said second transmission relay 72 serves for switching on the "recording transmission" mode in the central machine 14, in which mode in the central machine the switch 17 for switching on the recording functions and a further switch 77 for connecting the motor 19 to a voltage source V4 are closed. By the connection of the motor 19 to the voltage source V4 the record carried in the central machine 14 in the "recording transmission" mode can be driven with the same speed of transport as the record carrier in the dictation machines 3 in the "playback transmission" mode. Another switch 20 is coupled to the switch 17 for switching on the recording functions in the central machine 14 by means of which switch 20 a busy-relay 78 can be energized. The busy-relay 78 is operatively connected to a normally closed switch 79 in the drive means 73 for the switching arm 69 of the selector 68, which switch 79 is connected in series with said switches 75 and 76, and prevents the motor 74 of the drive means 73 from being started when the busy-relay 78 is energized. Thus, an existing connection between a remote station and the central station cannot be interrupted by a calling remote station.

After recording a dictation has been completed the transmission button 26 of the dictation machine 3 is actuated in order to transmit the completed dictation from the dictation machine 3 of a remote station 2 to the central station 14. As a result, the switch 29 of the switching means 27 is closed and the rewind relay 4 is energized, so that the "fast rewind" mode is switched on and the record carrier in the dictation machine 3 is rewound to the beginning of the dictation to be transmitted. When the beginning of said dictation is reached, the control switch 51 of the detection means 50 is closed and the detection relay 52 thereof is energized, so that the switch 49 opens and thus the "fast rewind" mode is discontinued and the switch 54 is closed. This condition which is obtained by means of the energized detection relay 52 is maintained by the self-holding contact 53 of said relay. As a result, the selection relay 58 which selects the central stations 1 is energized, which relay via the control connections 64, 65 and 66 closes the switch 75 of the drive means 73 for the switching arm 69 of the selector 68.

When the central machine 14 is occupied by another remote station 2, so that the switch 20 is closed, the busy relay 78 is energized and the switch 79 of the drive means 73 is opened, the motor 74 of the drive means 73 is stopped until the central machine 14 is no longer engaged. After the busy condition is over the motor 74 is automatically started by the actuated switching means 27 of the calling remote station 2, so that the switching arm 79 begins to search for the calling remote station. When the central station 1 is not engaged, a search operation is started immediately.

When the switching arm 69 reaches that input 70 to which the first transmission relay 57 of the switching means 27 of the calling remote station 2 is connected, said first transmission relay 57 and the second transmission relay 72 at the output 71 of the selector 68 are energized, so that the signal path 32 between the dictation machine 3 of the calling remote station 2 and the central machine 14 is closed, the "playback transmission" mode in the dictation machine 3 of the calling remote station 2 and the "recording transmission" mode in the central machine 14 are switched on. The dictation is then transmitted from the dictation machine of the remote station to the central machine with a high speed of transport of the record carrier in the dictation machine 3 of the calling remote station 2 and in the central machine 14. Subsequent playback of a transmitted dictation on one of the playback machines 15 of the central station 1 is then effected with the same speed of transport of the record carrier as during recording of the transmitted dictation on of one of the dictation machines of the remote stations, so that during playback the transmitted dictation will have the same frequency response as during recording.

The step of making the speed of transport of the record carrier in the dictation machines and in the central machine during transmission for example a factor ten higher than during recording of a dictation, yields the advantage of an even shorter busy-periods of the central machine and the connection means to said machine. By provision of a selection means as described hereinbefore, it is furthermore also possible to call the engaged central station by the actuation of the transmission button, the selection means automatically connecting all remote stations that are calling consecutively to the central station. Thus, the users of the remote stations do not have to wait until the central station is free again, which also means a saving of time. Moreover, each user then has the possibility, if he needs the machine, which is switched on for the transmission of a dictation and which is thus occupied, for other purposes, to disconnect said machine from the selection means by changing the record carrier in said machine.

What is claimed is:

1. A dictation system comprising a multiplicity of remote stations and one central station which can be selected by said remote stations and which comprises at least one recording and playback machine, which remote stations can optionally be connected to the central station when said central station is free for the transmission of dictations, wherein each remote station comprises a recording and playback machine comprising means for recording dictation at a normal speed of transport of a record carrier transport;

said remote station machine includes a switching means for calling the central station and establishing a signal path between the remote station machine and the central station machine for the transmission of the dictation in response to actuation, effected upon completion of a recording procedure, when the central station is not busy;

the remote station machine comprises means for switching on a "playback transmission" mode for playing back recorded dictation at a first predetermined speed of transport of the remote station record carrier, the quotient of said first predetermined speed divided by the normal speed being a given quotient greater than one;

the central station machine comprises means for switching on and off a "recording transmission" mode for recording the dictation being transmitted at a second predetermined high speed of transport of the central station record carrier, and means for playing back a transmitted dictation which has been recorded on the central station machine at a third predetermined speed which is smaller than said second predetermined speed, the quotient of said second predetermined speed divided by said third predetermined speed being equal to said given quotient;

the central station comprises a priority selection means, responsive to selection by actuation of the switching means of the machine of a remote station which has priority over the switching means of the machines of all other calling remote stations, when the central station is engaged, for blocking the switching means of the machines of all other calling remote stations from switching on said "playback transmission" mode; and when the central station is free, for establishing a connection with a machine of one of said all other calling remote stations and unblocking the switching means of the machine of said one selected remote station; each remote station further comprising end stop means for automatically cancelling selected modes of operation of the remote station and clearing the "recording transmission" mode and initiating establishment of another connection by the priority selection means of the central station, upon completion of the transmission of a dictation to be recorded on the central station machine; and at least one remote station further comprises means, responsive to the switching means of said at least one remote station being actuated and being blocked by said priority selection means, for cancelling the actuation of the switching means of said at least one remote station, in response to changing the record carrier in the machine of said at least one remote station.

2. A dictation system as claimed in claim 1, wherein said first and second predetermined speeds are substantially equal.

3. A dictation system as claimed in claim 1 comprising means, responsive to actuation of the switching means of the machine of a remote station before the "recording transmission" mode is switched on, for rewinding the record carrier to the beginning of the dictation in the "rewind" mode before transmission.

4. A dictation system as claimed in claim 1 comprising means, responsive to completion of a recording operation in the machine of a given remote station and the given remote station being put in the "playback transmission" mode, for transporting the record carrier in a direction opposite to that during recording of a dictation; and means in the central station machine for transporting the record carrier during playback of the dictation, after transmitted dictation has been recorded, in a direction of transport also opposite to that used in the "recording transmission" mode of the central station machine.

* * * * *